US008621634B2

(12) United States Patent
Turbin

(10) Patent No.: US 8,621,634 B2
(45) Date of Patent: Dec. 31, 2013

(54) MALWARE DETECTION BASED ON A PREDETERMINED CRITERION

(75) Inventor: Pavel Turbin, Jokela (FI)

(73) Assignee: F-Secure Oyj, Helsinki (FI)

(*) Notice: Subject to any disclaimer, the term of this patent is extended or adjusted under 35 U.S.C. 154(b) by 160 days.

(21) Appl. No.: 12/930,728

(22) Filed: Jan. 13, 2011

(65) Prior Publication Data
US 2012/0185939 A1 Jul. 19, 2012

(51) Int. Cl.
G06F 21/00 (2013.01)

(52) U.S. Cl.
USPC ............. 726/24; 713/152; 713/165; 713/187; 713/188; 713/189; 706/62; 711/162; 726/22; 726/23; 726/26

(58) Field of Classification Search
USPC ....................................... 726/24, 25
See application file for complete search history.

(56) References Cited

U.S. PATENT DOCUMENTS

| | | | | |
|---|---|---|---|---|
| 6,611,925 B1* | 8/2003 | Spear | ......................... | 714/38.14 |
| 6,775,536 B1* | 8/2004 | Geiger et al. | ................. | 455/411 |
| 7,953,984 B1* | 5/2011 | Chung et al. | .................. | 713/188 |
| 8,079,060 B1* | 12/2011 | Zaitsev | .............................. | 726/1 |
| 8,381,297 B2* | 2/2013 | Touboul | ......................... | 726/24 |
| 8,392,379 B2* | 3/2013 | Lee | ............................... | 707/687 |
| 2002/0174137 A1* | 11/2002 | Wolff et al. | ................... | 707/200 |
| 2002/0174349 A1* | 11/2002 | Wolff et al. | .................... | 713/188 |
| 2006/0218637 A1* | 9/2006 | Thomas et al. | ................. | 726/23 |
| 2007/0240221 A1* | 10/2007 | Tuvell et al. | .................... | 726/24 |
| 2007/0240222 A1* | 10/2007 | Tuvell et al. | .................... | 726/24 |
| 2008/0163228 A1* | 7/2008 | Murata et al. | ................. | 718/103 |
| 2009/0019547 A1* | 1/2009 | Palliyil et al. | .................... | 726/25 |
| 2009/0063108 A1* | 3/2009 | De Atley et al. | .................. | 703/2 |
| 2010/0242109 A1* | 9/2010 | Lee | .................................. | 726/22 |
| 2012/0066762 A1* | 3/2012 | Todorovic | ........................ | 726/22 |
| 2012/0159631 A1* | 6/2012 | Niemela et al. | ................. | 726/24 |

OTHER PUBLICATIONS

IMDS: Intelligent Malware Detection System|http://users.cs.fiu.edu/~taoli/pub/p1043-ywly-kdd.pdf|Ye et al.|Aug. 12, 2007|pp. 1-5.*

* cited by examiner

Primary Examiner — Mahfuzur Rahman
(74) Attorney, Agent, or Firm — Harrington & Smith

(57) ABSTRACT

A computer-implemented method of scanning a plurality of files stored in a memory of a computer for malware. The computer includes a processor. The method includes, for each respective file of said plurality of files in said memory determining, using said processor, whether a relationship between the respective file and stored data satisfies a predetermined criterion. The stored data indicates one or more files determined not to contain malware and for which data associated with each of said one or more files has a predetermined characteristic. If the relationship satisfies the predetermined criterion, the respective file is processed according to said first processing method and if said relationship does not satisfy said predetermined criterion, the respective file is processed according to said second processing method.

10 Claims, 5 Drawing Sheets

MALWARE DETECTION BASED ON A PREDETERMINED CRITERION

TECHNICAL FIELD

The present invention relates to the detection of malware and particularly, but not exclusively, to detection of malware in which different methods can be selectively used to detect malware in the processing of particular files.

BACKGROUND OF THE INVENTION

The term "malware" is short for malicious software and is used as a term to refer to any software designed to infiltrate or damage a computer system without the owner's informed consent. Malware can include viruses, worms, trojan horses, rootkits, adware, spyware and any other malicious and unwanted software. Any computer device, such as a desktop personal computer (PC), laptop, personal data assistant (PDA) or mobile phone, can be at risk from malware.

When a device is infected by malware the user will often notice unwanted behaviour and degradation of system performance as the infection can create unwanted processor activity, memory usage, and network traffic. This can also cause stability issues leading to application or system-wide crashes. The user of an infected device may incorrectly assume that poor performance is a result of software flaws or hardware problems, taking inappropriate remedial action, when the actual cause is a malware infection of which they are unaware.

Computer devices make use of anti-virus software to detect and possibly remove malware. This anti-virus software can make use of various methods to detect malware including scanning data on the computer. Malware scanning generally involves examining files for a virus fingerprint or "signature" that is characteristic of an individual malware program.

Malware scanning can require a large amount of processor time as large quantities of data generally needs to be checked each time a malware scan is carried out. Some anti-virus software therefore stores a hash for each file that is scanned and identified as not containing any malware. When a file that has previously been scanned and identified as not containing any malware is subsequently checked for malware by the anti-virus software, a corresponding hash can be generated from the file and checked against stored hashes. If a stored hash and newly generated hash match then the file has not been modified and since it was previously scanned and identified as not containing any malware it is determined that the file still does not contain any malware and full scanning is not carried out.

SUMMARY

It is an object of the invention to provide further improvements in malware scanning.

According to a first aspect of the invention there is provided a computer-implemented method of scanning a plurality of files stored in a memory of a computer for malware, the computer comprising a processor. The method comprises, for each respective file of said plurality of files in said memory, determining, using the processor, whether a relationship between the respective file and stored data satisfies a predetermined criterion, wherein the stored data indicates one or more files determined not to contain malware and for which data associated with each of the one or more files has a predetermined characteristic. If the relationship satisfies the predetermined criterion, processing, by the processor, the respective file for malware according to the first processing method and if the relationship does not satisfy the predetermined criterion, processing, by the processor, the respective file for malware according to the second processing method.

In this way, only those files that have both previously been determined not to contain malware and that satisfy a predetermined criterion are indicated by the stored data. In some prior art systems all files that have previously been determined not to contain malware are indicated by stored data such that they are processed according to an alternative method such as a data verification method. However processing all files that have been previously determined not to contain malware according to an alternative method can be problematic because a large amount of data associated with previously processed files is stored. Additionally, processing some files to determine whether such files contain malware is straightforward and can be quicker than using alternative methods such as data verification methods. As such, a first processing method, for example a method based upon stored data may be used if the relationship satisfies a predetermined criterion, while a second processing method, for example a malware scanning method may be used if the relationship does not satisfy the predetermined criterion. In this way, stored data may relate to files not containing malware and having particular properties. In this way, the stored data may provide a 'whitelist' of all clean files which have particular properties.

References herein to 'memory' are intended to cover any data storage medium including, without limitation, both volatile memory (e.g. RAM) and non-volatile memory (e.g. a hard disk drive).

The data associated with each of the one or more files may be based upon processing of a respective one of the one or more files by at least one of the first and second processing methods. For example, the data associated with each of the one or more files may indicate (or otherwise be based upon) a time associated with processing a respective one of the one or more files according to one of the first and second processing methods. The predetermined characteristic may be that the data indicating a time associated with processing a respective one of the one or more files according to one of the first and second processing methods exceeds a predetermined time. The predetermined time may be based upon a time derived from a time taken to process each of a plurality of files, such that stored data relates to files taking a particularly long time to process using a particular processing method (relative to others of the files). For example, the times taken to process each of the files may be sorted and the N files having the longest processing times may be those having the predetermined characteristic.

Additionally or alternatively, the data associated with each of the one or more files may be based upon a complexity of processing associated with processing a respective one of the one or more files according to one of the first and second processing method. Such complexity of processing may be based upon a number of CPU cycles taken to process a file or to unpack file entries.

Additionally or alternatively, the data associated with each of the one or more files may be based upon a size of a respective one of the one or more files.

Additionally or alternatively, the data associated with each of the one or more files may be based upon a number of copies of the files stored on one or more computers. For example, data may be stored only for files not containing malware which occur more than a predetermined number of times on one or more computers which are to be scanned for malware. In this way, the stored data may relate to particularly prevalent files thereby enhancing the efficiency of the scanning method. The one or more computers may be communicatively coupled to a server, and the server may be configured to provide malware scanning functionality.

The predetermined criterion may be that the respective file is one of the one or more files indicated by the stored data. That is, the stored data may identify one or more files.

The first processing method may comprise performing a data verification operation. The data may comprise hash data for each of the one or more files and the data verification operation may comprise generating a hash for the respective file and comparing the generated hash with the hash data. Indeed, any suitable method for verifying that data associated with the respective file corresponds to stored data that is known to not contain malware may be used.

The second processing method may be a malware scanning method. The malware scanning method may use any suitable methods for determining whether a file contains malware.

One of the first and second processing methods may be a malware scanning method and the predetermined characteristic may be based upon a time associated with processing a file according to said malware scanning method.

The method may further comprise processing the respective file to generate identification data, and the relationship between the respective file and the stored data may be based upon the identification data and the stored data.

According to a second aspect of the invention there is provided a computer-implemented method of generating stored data for use in malware scanning, the data indicating one or more files, the method being implemented in a computer comprising a memory in communication with a processor, the method comprising receiving, as input to the processor, for each respective one of a plurality of files determined not to contain malware, data associated with the respective one of the plurality of files; and generating, by the processor, the stored data based upon a relationship between the received data and the predetermined criterion.

As such, the second aspect of the invention provides a method for generating stored data useful in a malware scanning method according to the first aspect of the invention. In particular, the second aspect of the invention generates stored data associated with files which do not contain malware and which satisfy some other criterion—such other criterion may be based upon the files themselves or upon processing of the files.

The data associated with the respective one of the files may be based upon processing of the respective one of the files by a first processing method. The data associated with the respective one of the files may be based upon a time associated with processing the respective one of the files according to the first processing method. The predetermined criterion may be that the data indicates that a time associated with processing the respective one of the files according to the first processing method exceeds a predetermined time.

The first processing method may be a malware scanning method.

Additionally or alternatively the data associated with the respective one of the files may be based upon a number of copies of the file stored on one or more computers or may be based upon a size of the file.

The stored data may comprise identification data for at least some of said files.

At least some of the files may be files for which the predetermined criterion is satisfied.

The stored data may comprise hash data generated from at least some of the files. Such hash data may comprises one or more hashes for each file. Where more than one hash is stored, each hash may be generated from a respective part of the respective file.

Aspects of the invention may be combined. In particular, the stored data generated according to the second aspect of the invention may be used in the first aspect of the invention.

Aspects of the invention can be implemented in any convenient form. For example computer programs may be provided to carry out the methods described herein. Such computer programs may be carried on appropriate computer readable media which term includes appropriate non-transient tangible storage devices (e.g. discs). Aspects of the invention can also be implemented by way of appropriately programmed computers and other apparatus.

BRIEF DESCRIPTION OF THE DRAWINGS

Embodiments of the present invention will now be described, by way of example only, with reference to the accompanying drawings, in which.

DETAILED DESCRIPTION

Figure 1:
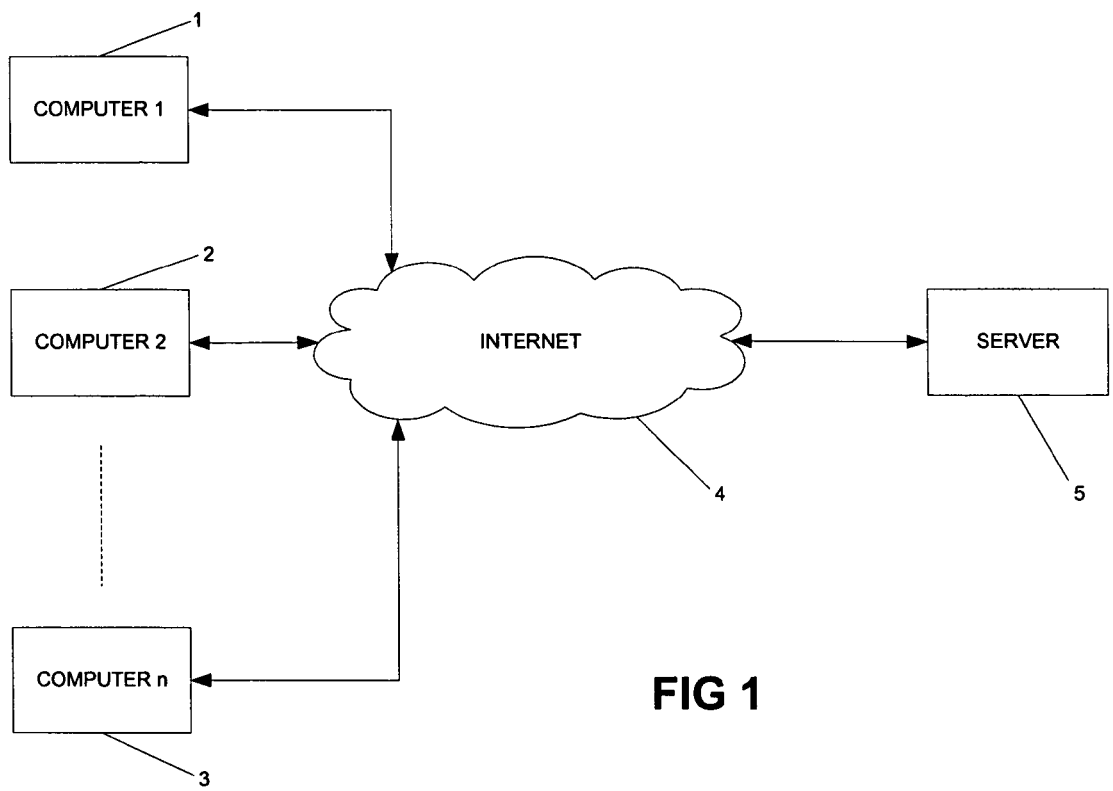
FIG. 1 is a schematic illustration of a network of computers suitable for carrying out the invention.

Referring first to FIG. 1, a plurality of computers 1, 2, 3 each are provided with malware detection software to detect files stored on the computer that are affected by malware. The computers 1, 2, 3 are each arranged to communicate with the Internet 4 and can communicate with other ones of computers 1, 2, 3 as well as with further computers via the Internet 4. Communication between computers using the Internet allows malware to be passed between computers and as such data stored on a computer is generally processed using the malware detection software periodically to identify either new files that are affected by malware or to identify files that have been affected since previously scanning the data stored on the computer using the malware detection software. A server 5 is arranged to communicate with each of the computers 1, 2, 3 and provides back-end malware detection functionality.

The back-end malware detection functionality includes collecting and processing data associated with the malware detection software running on each of the computers 1, 2, 3 to generate stored data which allows files to be identified for which scanning the files using a hash based method, as described in further detail below, is preferable, rather than scanning the files using malware scanning techniques. The stored data may include identification data that allows files to be identified on the computers connected to the server 5 which take a large amount of time, relative to other files, to scan using malware scanning techniques. The stored data may additionally include a hash which can be used to determine whether data associated with a file corresponds to data of a file which has been determined not to contain malware using a hash based method, which is generally quicker than scanning the file using malware scanning techniques where the file takes a large amount of time to scan using malware scanning techniques. Files which can be scanned relatively quickly on the computers 1, 2, 3 using malware scanning techniques running locally on the computer are processed locally to determine whether the files contain malware.

Figure 1A:
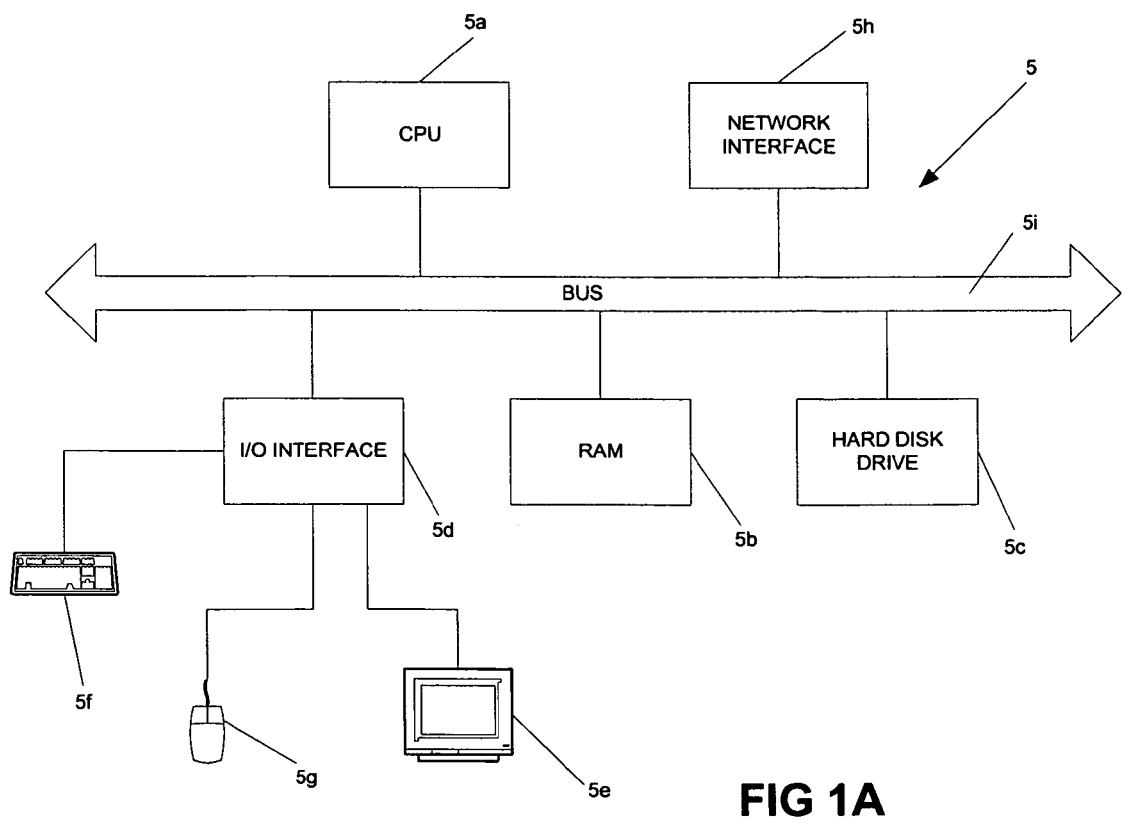
FIG. 1A is a schematic illustration of a server of FIG. 1.

FIG. 1A shows the server 5 of the system of FIG. 1 in further detail. It will be appreciated that each of the computers 1, 2, 3 has the general architecture shown in FIG. 1A. It can be seen that the server 5 comprises a CPU 5a which is configured to read and execute instructions stored in a volatile memory 5b which takes the form of a random access memory. The volatile memory 5b stores instructions for execution by the CPU 5a and data used by those instructions. For example, in use, the software used to generate stored data indicating files for which scanning the files using a hash based method is preferable may be stored in the volatile memory 5b.

The server 5 further comprises non-volatile storage in the form of a hard disc drive 5c. Data such as the data indicating files for which scanning using a hash based method is preferable may be stored on the hard disc drive 5c. The server 5 further comprises an I/O interface 5d to which are connected peripheral devices used in connection with the server 5. The server 5 has a display 5e configured so as to display output from the server. Input devices are also connected to the I/O interface 5d. Such input devices include a keyboard 5f, and a mouse 5g which allow user interaction with the server. A network interface 5h allows the server 5 to be connected to an appropriate computer network so as to receive and transmit data from and to other computing devices such as the computers 1, 2, 3 of FIG. 1. The CPU 5a, volatile memory 5b, hard disc drive 5c, I/O interface 5d, and network interface 5h, are connected together by a bus 5i.

Figure 2:
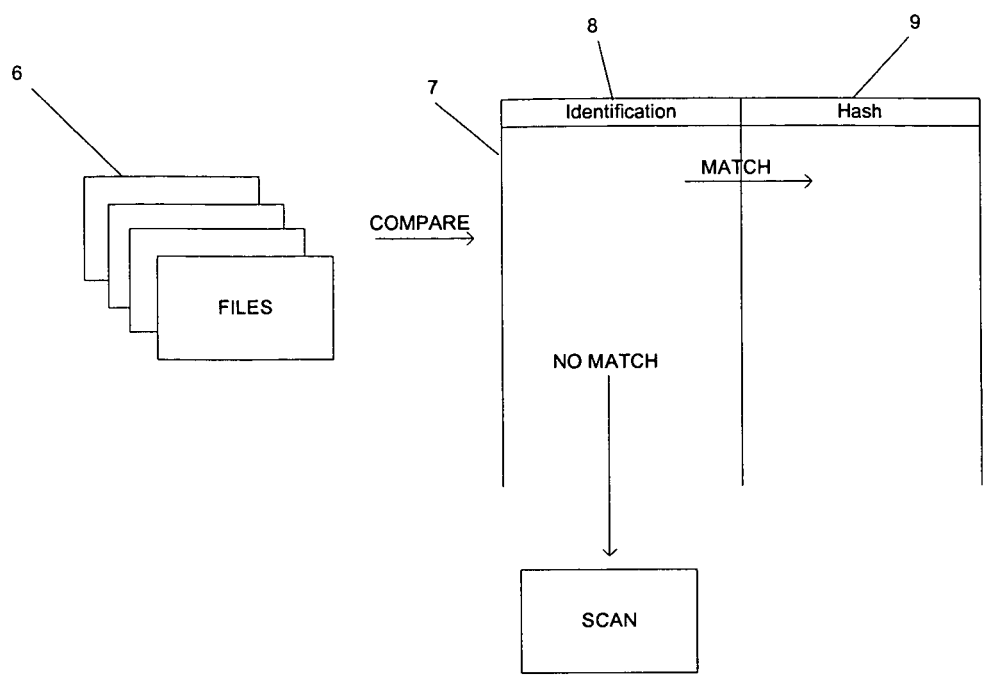
FIG. 2 is a schematic illustration of the selection of processing methods for files according to an embodiment of the invention.

Referring to FIG. 2, the selection of a processing method for a plurality of files to be processed 6 is illustrated schematically. As indicated above, the selection of a processing method uses stored data which may take the form of a table 7 which stores data associated with a plurality of files for which scanning the files using a hash based method is preferable, rather than scanning the files using malware scanning techniques. The data associated with each of the plurality of files for which scanning the files using a hash based method is preferable may take the form of identification data 8 with respect to which data generated from each of the plurality of files to be processed 6 is processed to determine whether the file to be processed should be processed using hash based methods, and hash data 9 associated with the identification data 8 which is used to process the file identified by the identification data 8 using hash based methods. Where processing of the data generated from a particular one of the plurality of files with each of the identification data 8 does not determine that the file to be processed should be processed using hash based methods the file is processed using malware scanning techniques.

Figure 3:
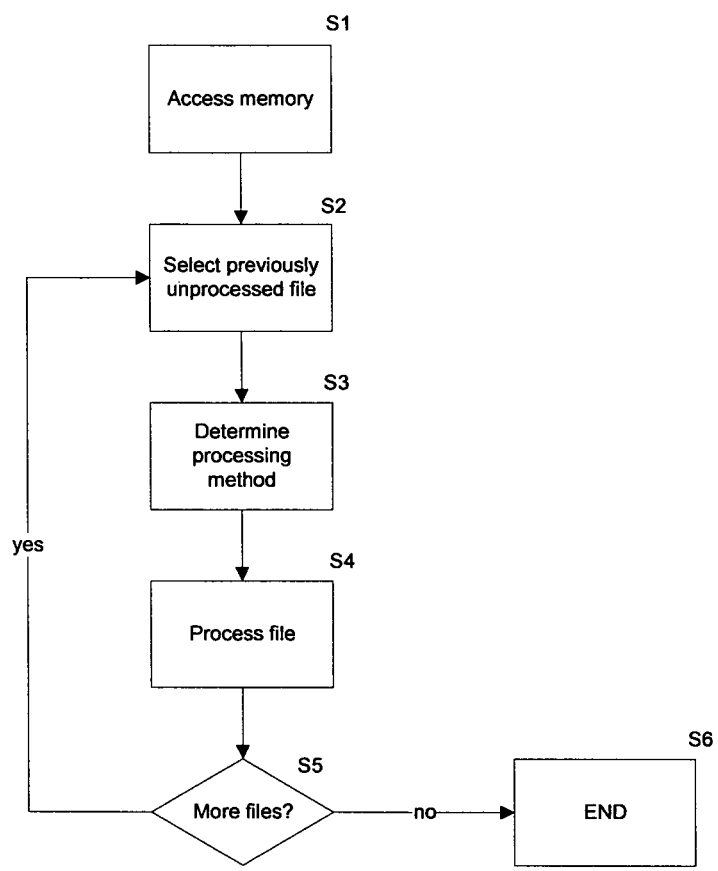
FIG. 3 is a flowchart showing processing to scan a plurality of files on a computer system for malware.

Referring now to FIG. 3, processing to scan a plurality of files on a computer 1, 2, 3 for malware is shown. At step S1 the files to be processed are accessed in memory and at step S2 a previously unprocessed file is selected for processing. At step S3 a processing method for the file selected at step S2 is determined based upon a relationship between the file and stored data which allows files to be identified as described above and in further detail below with reference to FIG. 4. Generation of the stored data is described below with reference to FIGS. 7 and 8. At step S4 the file is processed according to the processing method determined at step S3. Two processing methods are described below with reference to FIGS. 5 and 6. At step S5 a check is carried out to determine whether there are files still to be processed according to the processing of steps S2 to S4. If there are more files to be processed then at step S2 a further file is selected, otherwise all files have been processed and at step S6 processing terminates. The processing of FIG. 3 may be carried out on computers 1, 2, 3 periodically, for example at a predetermined time every week, to determine whether any files on the computer contain malware.

Figure 4:
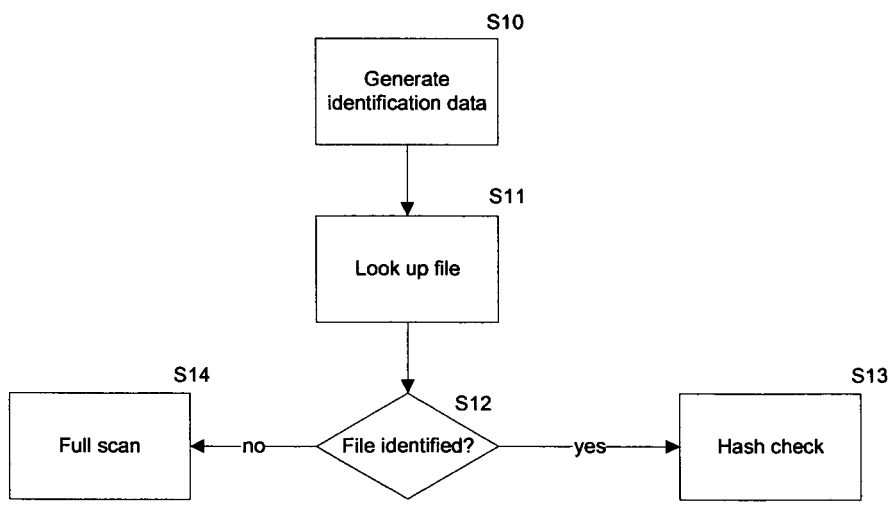
FIG. 4 is a flow chart showing processing to select a processing method in the flowchart of FIG. 3 in more detail.

Referring to FIG. 4, the processing to select a processing method at step S3 of FIG. 3 is shown in further detail. At step S10 data associated with the file is generated. The data associated with the file generally takes the form of a short hash using parts of the file that are most useful for identification of the file such as a header. At step S11 the data associated with the file is processed together with stored data in a look-up operation. If the look-up operation indicates that the file is identified (i.e. there is a match between the data associated with the file and the stored data) then the file is a file for which processing using malware scanning techniques requires a relatively large amount of processing. The stored data is generally stored at the server 5 which maintains and updates the stored data and as such the data associated with the file is transmitted to the server 5 which carries out the look-up operation, although it will be appreciated that the stored data may be stored on each computer 1, 2, 3 such that the look-up operation is carried out on the computers 1, 2, 3. Where the data is stored on computers 1, 2, 3, the server 5 regularly transmits data to each computer 1, 2, 3 which is used to replace or update the stored data.

At step S12 it is determined whether the file is identified by the stored data. If it is determined that the file is identified by the stored data, based upon the data associated with the file, then the file has previously been determined not to contain malware and processing of the file using malware scanning techniques requires a relatively large amount of processing. As such, at step S13 the file is processed to determine whether the file contains malware using a hash check method as described below with reference to FIG. 5. Otherwise the file has either not previously been processed using malware scanning techniques and determined to not contain malware, or scanning the file using malware scanning techniques is relatively straightforward, for example requiring a relatively small amount of processing time. As such, the file is processed at step S14 using malware scanning techniques using the processor of the computer on which the file is stored.

Whilst it has been described above that each file is processed in turn to generate identification data and the file is then processed according to a processing method selected based upon the identification data, it will be appreciated that parts of the processing of FIGS. 3 and 4 may be carried out such that a plurality of files are processed at each step. For example, identification data may be initially generated for all files and processed to select a processing method for each file. All files may then be processed according to their respective processing method.

Figure 5:
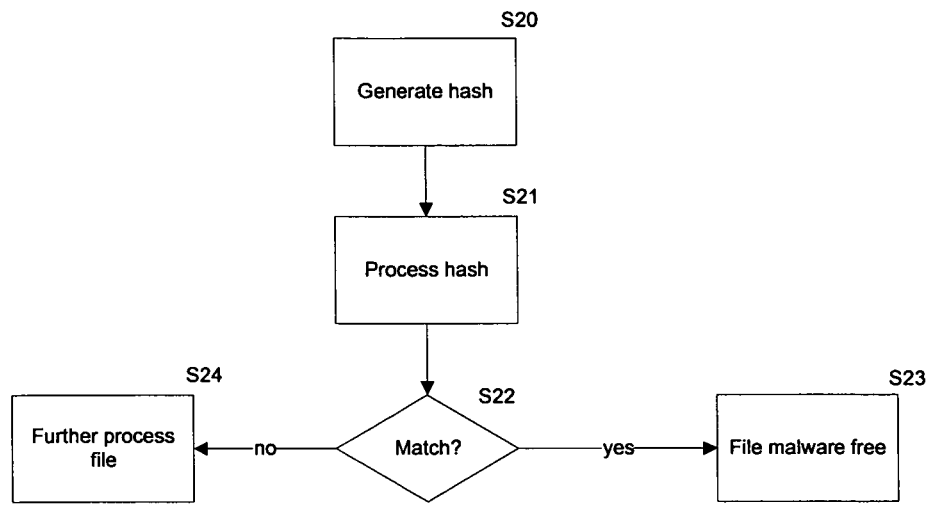
FIG. 5 is a flow chart showing an example of file processing in the flowchart of FIG. 3 in more detail.

Referring now to FIG. 5, the hash based processing method of step S13 of FIG. 4 is shown. As indicated above, the hash based processing method is used to process files that are identified by stored data. The stored data comprises two associated data items for each of a plurality of files for which scanning those files using a hash based method is preferable: an identification data item is used in the look-up operation of step S11 of FIG. 4 and may take any convenient form such as a short hash; and a second hash data item that is used in a further check, described below with reference to step S21 of FIG. 5, to determine whether the data of the identified file is identical to data that has previously been processed using malware scanning techniques and determined not to contain malware. If the data of the identified file is identical to the previously processed data then it can be determined that the data of the identified file does not contain malware. The initial look-up may be any well-known data identification look-up, although typically a relatively simple look-up is used in order to minimise processing at the file identification stage. The further check is a more comprehensive check which is able to determine whether data of the identified file has been modified.

In more detail, at step S20 a hash is generated from the file to be checked. The hash that is generated is suitable for determining whether data of the file is identical to previously processed data. At step S21 the hash is processed together with stored data associated with previously processed data that was determined to not contain malware. For example, the stored data associated with previously processed data may be a further hash generated from the previously processed data, and the processing of step S21 may comprise comparing the hash generated from the file to be checked and the further hash. The data associated with previously processed data is in general stored in a central location accessible to a plurality of computers such as the server 5 of FIG. 1, but may be stored locally and periodically updated based upon data communicated from the server 5. At step S22 a check is carried out to determine whether the processing of step S21 indicates that the data of the file to be checked corresponds to data of a file that does not contain malware and if the check is satisfied then processing passes to step S23 where it is indicated that the file to be checked does not contain any malware. Otherwise the file cannot be determined to not contain malware and is further processed at step S24 by processing the file according to malware detection software.

Whilst it has been described above that a hash based processing method is used, it will be appreciated that any data verification method that checks whether data to be tested is identical to data that has previously been tested and found to not contain malware may be used.

Figure 6:
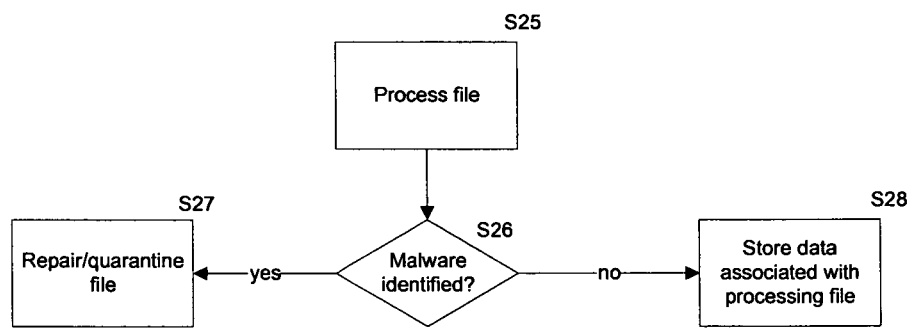
FIG. 6 is a flow chart showing a further example of file processing in the flowchart of FIG. 3 in more detail.

Referring to FIG. 6 processing to carry out the malware scanning of step S14 of FIG. 4 is shown. At step S25 the file is processed using malware scanning techniques to determine whether the file contains malware according to any suitable method. At step S26 a check, is carried out to determine whether any malware was identified at step S25. If the file contains malware then at step S27 the file is processed to repair or quarantine the file. Otherwise at step S28 data associated with processing the file at step S25 is stored. For example, the data may comprise data indicating a time associated with carrying out the processing of step S25. The data associated with processing the file is stored together with data identifying the file such as, for example, a location of the file in the memory of the computer on which the file is stored.

Figure 7:
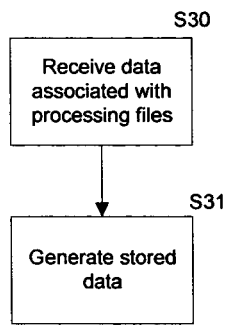
FIG. 7 is a flow chart showing processing to generate stored data.

Data associated with processing files at step S28 of FIG. 6 is used to generate stored data which is used in the look-up operation of step S11 of FIG. 4 to determine which processing method is to be used. As shown in FIG. 7, at step S30 the data is received at the server 5 from each of the computers 1, 2, 3 that are in communication with the server 5 and at step S31 the server 5 processes the provided data to generate stored data.

The stored data allows files to be identified that satisfy a predetermined condition associated with a time required to process the files using malware scanning techniques. For example the predetermined condition may be used to identify a predetermined proportion of the files such that the identified predetermined proportion require the largest amount of time to process using malware scanning techniques. Alternatively the predetermined condition may be that the file takes a time greater than a predetermined time to process using malware scanning techniques. In this way, where a file can be processed using malware scanning techniques relatively quickly using the processor of the computer on which the file is stored, local scanning is used. However if the file takes a large amount of time to process using malware scanning techniques, when the file is subsequently identified on either the same computer or on a different computer then hash scanning is used. Hash scanning is generally quicker for files which take a large amount of time to check using malware scanning techniques. Additionally, because the number of files for which data is stored is reduced by selectively storing data associated with files the look-up of step S11 is improved.

The predetermined condition may additionally take into consideration the prevalence of the files amongst the computers 1, 2, 3 in communication with the server 5. For example, the predetermined condition may be such that files satisfy the predetermined condition if and only if the file is identified on computers in communication with the server 5 greater than a predetermined number of times. In this way, the overall effect of processing to determine whether files contain malware on the network of computers in communication with the server 5 is taken into account when storing data. That is, whilst a particular file may take a relatively long time to scan using malware scanning techniques, if the file only occurs once in the network of computers in communication with the server 5, the overall increase in processing required in checking stored data associated with the file with each file on the network of computers in communication with the server 5 at step S11 of FIG. 4 may outweigh the positive effect of reducing the time associated with processing the file using malware scanning techniques, given the relatively low occurrence of the file.

Figure 8:
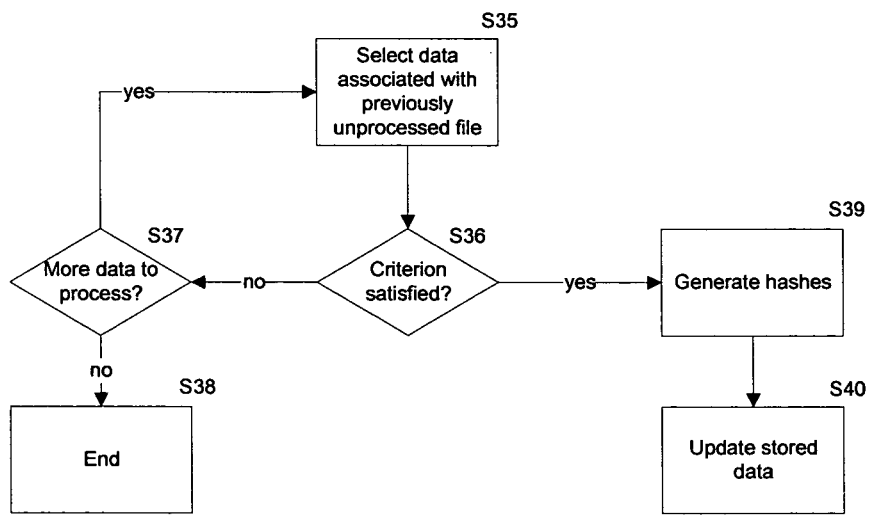
FIG. 8 is a flow chart showing part of the processing of FIG. 7 in further detail.

FIG. 8 shows the processing to generate stored data of step S31 in further detail. At step S35 data associated with a previously unprocessed file is selected and at step S36 a check is carried out to determine whether the data satisfies the criterion. If the criterion is not satisfied then at step S37 a check is carried out to determine if there are more files to be processed. If there are more files to be processed then processing returns to step S35 where data associated with a further file is selected, otherwise at step S38 processing ends. For each file that satisfies the criterion at step S36 processing passes to step S39 where the identification data used at step S11 of FIG. 4 to identify a file and the hash data used at step S21 of FIG. 5 to determine whether data associated with an identified file is identical to data associated with the currently processed file are both generated and at step S40 the stored data is updated based upon the hashes generated at step S39. The hashes are generated from the file, which may be retrieved from one of the computers 1, 2, 3 on which the file is located based upon the memory location stored at step S28 of FIG. 6, in any convenient way. In some embodiments the files are first processed using malware scanning techniques at the server to ensure that the file has not been affected by malware since the previous processing.

It will be appreciated that in some embodiments the predetermined condition requires pre-processing of the files. For example, where a number of occurrences of a file is used as part of the predetermined condition, it will be appreciated that the files may be initially processed to determine a number of occurrences of each file.

Although specific embodiments of the invention have been described above, it will be appreciated that various modifications can be made to the described embodiments without departing from the spirit and scope of the present invention. That is, the described embodiments are to be considered in all respects exemplary and non-limiting. In particular, where a particular form has been described for particular processing, it will be appreciated that such processing may be carried out in any suitable form arranged to provide suitable output data. Additionally, and as indicated above, whilst processing has been described above as being carried out for individual files in turn, various processing steps may be carried out for all files before proceeding to further processing steps.

The invention claimed is:

1. A method comprising:
    generating a whitelist of clean files for use in malware scanning, the whitelist indicating one or more files to be scanned using a data verification operation in preference to a malware scanning operation where generating the whitelist comprises:
    receiving, for each respective one of a plurality of files determined not to contain malware, data associated with said respective one of said plurality of files, and determining whether said data associated with said respective one of said plurality of files satisfies a predetermined criterion that is associated with a time required to process the respective file using a malware scanning operation; and
    for each respective file that satisfies the predetermined criterion, including the respective file in the whitelist and generating stored data that includes identification data used to identify the respective file and hash data to be used to perform a data verification operation.

2. A method according to claim 1, wherein said predetermined criterion is that said data indicates that a time associated with processing the respective one of said plurality of files according to said malware scanning operation exceeds a predetermined time.

3. A method according to claim 1, wherein the received data is based upon processing of the respective one of said plurality of files by at least one of said data verification operation and said malware scanning operation.

4. A method according to claim 3, wherein the received data indicates a time associated with processing a respective one of said plurality of files according to one of said data verification operation and said malware scanning method.

5. A method according to claim 1, wherein said data associated with each of said plurality of files is based upon a complexity of processing the respective file according to one of said data verification operation and said malware scanning operation.

6. A method according to claim 1, wherein said data associated with each of said plurality of files is based upon a size of the respective file.

7. A method according to claim 1, wherein said data associated with each of said plurality of files is based upon a number of copies of the respective files stored on one or more computers.

8. A method of scanning a plurality of files for malware using the whitelist generated according to claim 1, the method comprising:
    for each respective file of said plurality of files, generating identification data and comparing the generated identification data with identification data stored for the respective file in the whitelist to determine whether said respective file is included in the whitelist, and
    if said respective file is included in the whitelist, processing said respective file for malware according to said data verification operation including generating a hash for the respective file and comparing the generated hash with the corresponding hash data for the respective file included in the whitelist; and
    if said respective file is not included in the whitelist, processing said respective file for malware according to said malware scanning operation.

9. A non-transitory computer readable medium carrying computer program code comprising instructions configured to control a computer to carry out the method according to claim 8.

10. A computer apparatus for scanning a plurality of files stored in a memory of a computer for malware, the apparatus comprising:
    a memory storing processor readable instructions; and
    a processor configured to read and execute instructions stored in said memory;
    wherein said processor readable instructions comprises instructions configured to control the processor to carry out the method according to claim 8.

* * * * *